|  US007817646B2 |

(12) United States Patent
Guan et al.

(10) Patent No.: US 7,817,646 B2
(45) Date of Patent: Oct. 19, 2010

(54) COMMUNICATION SERVER NETWORK FOR COMPUTER NETWORKS

(75) Inventors: Qi Guan, Wien (AT); Josef Hosp, Deutsch Wagram (AT)

(73) Assignee: Siemens Aktiengesellschaft, Munich (DE)

(*) Notice: Subject to any disclaimer, the term of this patent is extended or adjusted under 35 U.S.C. 154(b) by 332 days.

(21) Appl. No.: 10/568,117

(22) PCT Filed: Jun. 30, 2004

(86) PCT No.: PCT/EP2004/007091

§ 371 (c)(1),
(2), (4) Date: Jan. 9, 2007

(87) PCT Pub. No.: WO2005/020536

PCT Pub. Date: Mar. 3, 2005

(65) Prior Publication Data

US 2007/0268912 A1    Nov. 22, 2007

(30) Foreign Application Priority Data

Aug. 13, 2003  (DE)  ................ 103 37 295

(51) Int. Cl.
*H04L 12/56* (2006.01)

(52) U.S. Cl. .................. 370/401; 370/389; 709/200; 709/224

(58) Field of Classification Search ............. 709/226, 709/229, 230, 201–203, 223, 224, 228, 227, 709/200, 209; 455/460; 370/352, 389, 401, 370/235, 282
See application file for complete search history.

(56) References Cited

U.S. PATENT DOCUMENTS

| 7,127,492 | B1* | 10/2006 | Calo et al. .................. 709/214 |
| 7,418,509 | B2* | 8/2008 | Koskelainen et al. ........ 709/229 |
| 2002/0129093 | A1* | 9/2002 | Donovan et al. ............ 709/203 |
| 2002/0147818 | A1* | 10/2002 | Wengrovitz ................. 709/228 |
| 2002/0184376 | A1* | 12/2002 | Sternagle .................... 709/230 |
| 2003/0012159 | A1* | 1/2003 | Vassilovski et al. ......... 370/335 |
| 2003/0027595 | A1* | 2/2003 | Ejzak ......................... 455/560 |
| 2003/0110257 | A1* | 6/2003 | Hyun et al. ................. 709/224 |
| 2003/0165231 | A1* | 9/2003 | Singh et al. ............ 379/265.09 |
| 2003/0229809 | A1* | 12/2003 | Wexler et al. ............... 713/201 |
| 2004/0088424 | A1* | 5/2004 | Park et al. ................... 709/229 |
| 2004/0205192 | A1* | 10/2004 | Olson et al. ................ 709/227 |
| 2005/0044127 | A1* | 2/2005 | Jaiswal et al. .............. 709/200 |

FOREIGN PATENT DOCUMENTS

WO    WO 02/23854 A2    3/2002

OTHER PUBLICATIONS

Chris A. Schwaderer, "Modular compute architectures: Load balancing examined", CompactPCI Systems, May 2003, pp. 1-4, XP002302684.
Anonymous, "Building A Strong Foundation for SIP-Based Networks Using F5 Networks' BIG-IP Traffic Manager", F5 Networks White Papers, 'Online', Aug. 2, 2002, pp. 1-6, XP002302685, Retrieved from the Internet: URL:http://www.f5.com/solutions/archives/whitepapers/SIPnetworks.html>, Retrieved on Oct. 25, 2004.

(Continued)

*Primary Examiner*—William Trost, IV
*Assistant Examiner*—Emmanuel Maglo

(57) ABSTRACT

The invention relates to a communication server network for computer networks that are based on the Internet protocol. Said communication server network supports data exchange according to the session initiation protocol and is provided with at least two conventional SIP servers as well as an SIP distributor server for distributing the tasks resulting from the communication processes to the at least two conventional stateful SIP servers.

9 Claims, 1 Drawing Sheet

OTHER PUBLICATIONS

Anonymous, "Figure 1", F5 Networks White Papers, 'Online', Aug. 9, 2002, p. 1, XP002302686, Retrieved from the Internet: URL:http//www.f5.com/solutions/archives/whitepapers/>, Retrieved on Oct. 25, 2004.

Anonymous, F5 Networks White Papers, 'Online' 2002, p. 1, XP002302687, Retrieved from the Internet: URL://http://www.f5.com/solutions/archives/whitepapers/>, Retrieved on Oct. 25, 2004.

* cited by examiner

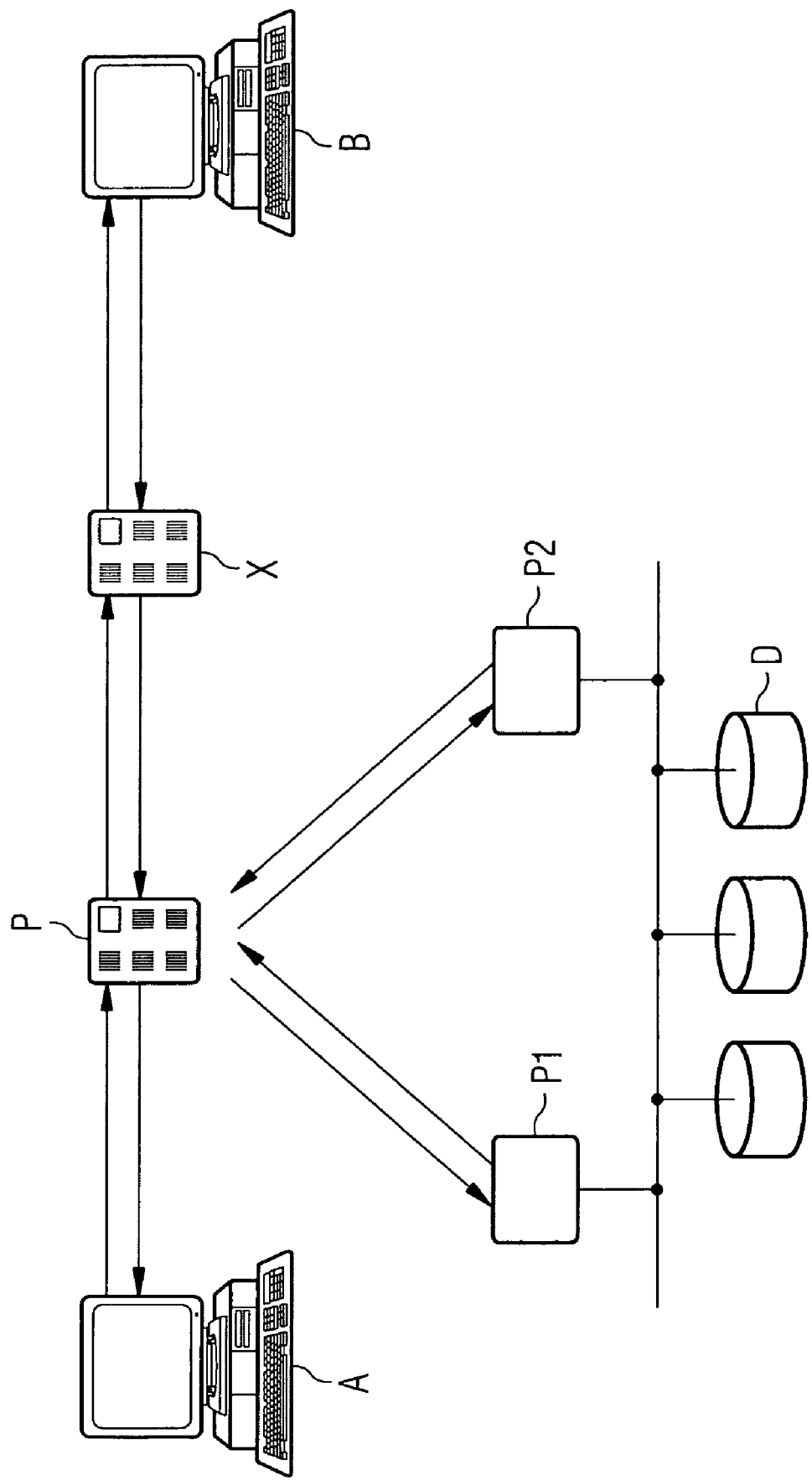

COMMUNICATION SERVER NETWORK FOR COMPUTER NETWORKS

CROSS REFERENCE TO RELATED APPLICATION

This application is the U.S. National Stage of International Application No. PCT/EP2004/007091, filed Jun. 30, 2004 and claims the benefit thereof. The International Application claims the benefits of German Patent application No. 103 37 295.4 DE filed Aug. 13, 2003, both of the applications are incorporated by reference herein in their entirety.

FIELD OF THE INVENTION

The invention relates to a communication server network for computer networks that are based on the internet protocol, said communication server network supporting a data exchange according to the session initiation protocol.

BACKGROUND OF THE INVENTION

Devices which offer central services in a distributed system for a number of users, the so-called clients, are referred to as servers, whereby the resources of the respective server can be used more effectively than if each client stored said resources locally and permanently themselves, but only for occasional use.

In a communication network according to the session initiation protocol, the servers then referred to as SIP servers are typically subdivided into three categories;

Proxy servers are located near to the client (Latin: Proximus=next, very near) and forward session initiation protocol notifications on behalf of the client, proxy servers appear transparent for the client, redirect servers which inform the client about the next hop(s), in other words the transmission of a data packet and registrar servers which manage the queries from so-called user agent clients in order to register their current address.

Clients can be telephones, in particular so-called softphones, i.e. personal computers with integrated telephones which can either be operated as user agent clients or as user agent servers and gateways for the purpose of connection control, in particular also as "interpreters" between different transmission formats and communication methods.

According to the prior art the SIP servers can either be configured as stateless SIP servers or as stateful SIP servers.

The stateless SIP servers allow requests transmitted by the client and/or directed thereto to be forwarded in a simple manner according to the SIP protocol, the server itself "forgetting" the process, whilst stateful SIP servers store the processes and actively engage in the communication process, in that they compare incoming notifications for instance in respect of their validity with the current state of a connection and reject them if necessary. Extended functionalities such as conference services for instance can be realized by means of stateful SIP servers.

SUMMARY OF THE INVENTION

The object underlying the invention is to specify a solution, with which a number of SIP servers can be flexibly interconnected to a network.

In accordance with the invention, this occurs with a communication server network of the type mentioned at the beginning in such a manner that provision is made for at least two conventional SIP servers as well as an SIP distributor server for distributing the tasks resulting from the communication processes to the at least two conventional SIP servers.

Customized server solutions can be produced using the communication server network according to the invention. In particular, a number of simple servers can be connected to a powerful main server or existing solutions can be tailored to an increasing number of CLIENTS.

It is advantageous if the SIP distributor server manages the distribution of the tasks on the basis of a transaction list, and if information about the individual communication processes is provided on the basis of an analysis of the received SIP requests.

This allows the distribution tasks to be implemented in a simple manner.

It is further advantageous if tasks are simply distributed in the SIP distributor server but the communication process is not processed. This ensures that the computer load for the SIP distributor server and thus the demands on server performance remain limited even with a large number of clients.

BRIEF DESCRIPTION OF THE DRAWINGS

The invention is described in more detail with reference to an exemplary embodiment displayed in the FIGURE.

FIG. 1—FIG. 1 illustrates the preferred embodiment of the invention.

DETAILED DESCRIPTION OF THE INVENTION

The exemplary computer network features a first client A, a second client B, a conventional SIP proxy server X assigned to the second client B, as well as an inventive communication server network assigned to the first client A with an SIP distributor server P and two conventional SIP servers P1 and P2 as well as assigned databases D.

The communication processes in the exemplary computer network are handled according to the session initiation protocol SIP, which in this instance is a standardized protocol for multimedia connections between different terminals in communication networks which are based on the internet protocol. The session initiation protocol SIP allows connections of this type to be established, managed, modified and terminated. The task of the session initiation protocol thus corresponds to the task of signaling protocols in conventional telephone networks.

The session initiation protocol SIP is thus suited both to connections between two subscribers KT of the communication network and also to connections between a number of subscribers KT and the entry and exit of subscribers during existing connections.

The main focus of use relates to communication networks according to the internet protocol but the session initiation protocol is also suited to use in other packet-oriented networks. In particular it features the following functionalities:

Localization Of A Target Subscriber

Determination Of The Multimedia Capability Of All Subscribers

Determination of the availability of a target subscriber, if a call can not be completed, because a target subscriber is not available, it is determined via the session initiation protocol whether the target subscriber has already called or cannot be reached and transmits a corresponding notification to the originating subscriber.

Establishment of a connection (session) between the subscribers and optionally entry and exit of subscribers during the connection.

The session initiation protocol is a peer-to-peer protocol, i.e. intended for communication by peer units, so-called user agents. Depending on the connection, these user agents can either operate as user agent clients or as user agent servers. The user agent client initiates a request, whilst the user agent server transmits a received request to the target subscriber and optionally sends a response to the originating subscriber.

In a physical approach, the components of a communication network according to the session initiation protocol are subdivided into the categories SIP clients and SIP servers.

The sequence of a typical connection establishment according to the session initiation protocol SIP is in this case as follows: The users are registered in the SIP communication network via their registrar server using the SIP address assigned to them in the format userID@gateway.com. The registrar server forwards this information on demand.

If a user initiates a call, an SIP request is routed to a SIP server (proxy server or redirect server). The request includes the address of the caller and the address of the intended target subscriber. The following requests are provided:

INVITE: Prompt to participate in a connection
BYE: Termination of a connection between two subscribers
OPTIONS: Interrogation of the connection options in terms of the possibilities for the subscriber and their terminal (with/without image etc)
STATUS: Exchange of information between servers about the current status of a signaling process
CANCEL: Cancellation of a request
OK: Positive confirmation of an INVITE
ACK: Positive confirmation of an OK
REGISTER: Transmits information relating to the location to a server If a connection is established via a conventional stateless SIP proxy server, in a first step the calling USER AGENT sends an INVITE prompt to the stateless SIP proxy server, this determines the path or the paths for the data transmission between the subscribers and thereupon forwards the request to the target subscriber/s. These respond to the stateless SIP proxy server which forwards the response to the caller and sets up a connection between the subscribers according to a real-time transfer protocol.

An exemplary connection establishment in the illustrated computer network with the inventive server network operates as follows:

In a first step the calling USER AGENT, first CLIENT A, sends an INVITE prompt to the SIP distributor server P which stores the connection request in a transaction list and forwards it to the first stateful SIP server P1 for further processing.

The tasks are distributed to the available stateful SIP servers P1 according to conventional algorithms for load distribution with distributed resources.

The stateful SIP server P1 determines the path or paths for the data transmission between the subscribers and thereupon forwards the request via the SIP distributor server P to the SIP proxy server X of the target subscriber, which in turn forwards the message to the target subscriber second CLIENT B. Second client B responds to the SIP distributor server P via the SIP proxy server X assigned to it, said SIP distributor server P forwards the response to the first stateful SIP server P1 on the basis of the transaction list and the information in the header of the SIP prompt, said stateful SIP server P1 in turn monitors that the connection establishment is proceeding correctly, forwards it to the caller via the SIP distributor server P and establishes a connection between the subscribers according to a real-time transfer protocol.

The invention claimed is:

1. A communication network for providing peer-to-peer communications for data transmission between a first and second client according to the session initiation protocol (SIP) as a control protocol used for session initiation protocol tasks of establishing, managing, modifying, and terminating connections between the first and second client, comprising:

a SIP distributor server (P) for distributing session initiation protocol tasks (SIP tasks) in communication with at least two SIP servers (P1 and P2) comprising conventional SIP server functionality of proxy server, redirect server, and registrar server with assigned databases for processing SIP tasks, wherein the SIP distributor server (P) is assigned to a first client (A) and, without processing SIP tasks, stores a connection request from first client (A) in a transaction list and distributes SIP tasks using a load distribution algorithm to one of the at least two SIP servers (P1 and P2) for processing the SIP tasks, wherein the SIP distributor server (P) using the load distribution algorithm to distributes the SIP tasks to a selected one of the at least two SIP servers (P1 and P2) on the basis of the transaction list and according to the load distribution algorithm that determines the available one of the at least two SIP servers (P1 and P2) based on load and not based on a look-up of a pre-assigned home server for the first client, and wherein the selected one of the at least two SIP servers (P1 and P2) processes the SIP task of determining a path for the data transmission, forwards the connection request to a proxy server of the second client via the SIP distributor server (P), and establishes a connection between the first and second client.

2. The communication network of claim 1 wherein the first client (A) and second client (B) are telephones.

3. The communication network of claim 1 wherein the first client (A) and second client (B) are softphones integrated into respective first and second personal computers.

4. The communication network of claim 1 wherein the first client (A) and second client (B) are user agents.

5. The communication network of claim 1 wherein the SIP servers (P1 and P2) are configured as stateless SIP servers for forwarding requests without storing.

6. The communication network of claim 1 wherein the SIP servers (P1 and P2) are configured as stateful SIP servers which store the processes.

7. The communication network of claim 1 wherein communications between the first client (A) and second client (B) are established in accordance with the SIP protocol by:

(a) the SIP distributor server (P) storing the connection request of the first client (A) in the transaction list and then forwarding the request to a first SIP server of the at least two SIP servers (P1 and P2) based on the load distribution algorithm, wherein the first SIP server is a stateful SIP server;

(b) the first SIP server determining a path and forwarding the request via the SIP distributor server (P) to a SIP proxy server of the second client (B) which forwards the request to the second client (B);

(c) the second client (B) responding to the SIP distributor server (P) via the SIP proxy server, and the SIP distributor server (P) forwarding the response to the first SIP server based on the transaction list and information in a header of a SIP prompt; and (d) the first SIP server monitoring for correct connection establishment and forwarding the response to the first client (A) via the SIP distributor server (P).

8. The communication network of claim 4 wherein the user agents are operated as either user agent clients to initiate requests as an originating subscriber or as user agent servers to transmit received requests to a target subscriber and optionally to send a response to the originating subscriber.

9. A method for providing peer-to-peer communications for data transmission across a communication network between a first and second client according to the session initiation protocol (SIP) as a control protocol used for session initiation protocol tasks of establishing, managing, modifying, and terminating connections between the first and second client, comprising
- providing a SIP distributor server (P) for distributing session initiation protocol tasks (SIP tasks) without processing the SIP tasks in communication with at least two SIP servers (P1 and P2) comprising conventional SIP server functionality of proxy server, redirect server, and registrar server with assigned databases for processing the SIP tasks, wherein the SIP distributor server (P) is assigned to a first client (A);
- storing by the SIP distributor server (P) a connection request by the first client (A) for peer-to-peer communication with a second client (B) in a transaction list and then forwarding the request using a load distribution algorithm to a first SIP server of the at least two SIP servers (P1 and P2) based on the load distribution algorithm that determines the available one of the at least two SIP servers (P1 and P2) based on load and not based on a look-up of a pre-assigned home server for the first client, wherein the first SIP server is a stateful SIP server;
- determining a path for the data transmission by the first SIP server and forwarding the request by the first SIP server via the SIP distributor server (P) to a SIP proxy server of the second client (B) which forwards the request to the second client (B);
- responding by the second client (B) to the SIP distributor server (P) via the SIP proxy server,
- forwarding by the SIP distributor server (P) the response to the first SIP server based on the transaction list and information in a header of a SIP prompt; and
- monitoring for correct connection establishment and forwarding by the first SIP server the response to the first client (A) via the SIP distributor server (P).

* * * * *